US012604242B2

(12) United States Patent
Wu

(10) Patent No.: US 12,604,242 B2
(45) Date of Patent: Apr. 14, 2026

(54) METHODS AND APPARATUSES FOR A MOBILITY ROBUSTNESS OPTIMIZATION (MRO) MECHANISM OF AN INTER-RAT HANDOVER PROCEDURE

(71) Applicant: LENOVO (BEIJING) LIMITED, Beijing (CN)

(72) Inventor: Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 462 days.

(21) Appl. No.: 18/007,181

(22) PCT Filed: Jul. 28, 2020

(86) PCT No.: PCT/CN2020/105250
§ 371 (c)(1),
(2) Date: Jan. 27, 2023

(87) PCT Pub. No.: WO2022/021077
PCT Pub. Date: Feb. 3, 2022

(65) Prior Publication Data
US 2023/0239750 A1      Jul. 27, 2023

(51) Int. Cl.
*H04W 36/00*          (2009.01)
*H04W 76/19*          (2018.01)
*H04W 76/30*          (2018.01)

(52) U.S. Cl.
CPC . *H04W 36/0079* (2018.08); *H04W 36/00226* (2023.05); *H04W 36/00837* (2018.08); *H04W 76/19* (2018.02); *H04W 76/30* (2018.02)

(58) Field of Classification Search
None
See application file for complete search history.

(56) References Cited

U.S. PATENT DOCUMENTS 12,150,003 B2 * 11/2024 Ishii ..................... H04W 76/15
12,256,453 B2 *  3/2025 da Silva .......... H04W 36/00837
(Continued)

FOREIGN PATENT DOCUMENTS

CN       107277868 A     10/2017
CN       109983833 A      7/2019
(Continued)

OTHER PUBLICATIONS

"3rd Generation Partnership Project; Technical Specification Group Radio Access Network; NR; Radio Resource Control (RRC) protocol specification (Release 16)", 3GPP Standard; Technical Specification; 3GPP TS 38.331; Jul. 24, 2020; vol. RAN WG2, No. V16.1.0; pp. 1-906; URL: ftp://ftp.3gpp.org/Specs/archive/38_series/ 38.331 /38331-g1 0.zip 38331-g1 0.docx.
(Continued)

*Primary Examiner* — Eunsook Choi
(74) *Attorney, Agent, or Firm* — AMPACC Law Group, PLLC

(57)          ABSTRACT

Embodiments of the present application relate to methods and apparatuses for a mobility robustness optimization (MRO) mechanism of an inter-radio access technology (RAT) handover procedure. According to an embodiment of the present application, a method can include: receiving a mobility command message from a source new radio (NR) cell, wherein the mobility command message includes an identifier (ID) of a target cell, and the target cell is at least one of an evolved universal terrestrial radio access network (E-UTRAN) cell and an universal terrestrial radio access network (UTRAN) cell; determining whether a timer for initiating failure recovery based on triggering a measurement report (e.g., timer T312) is running; and in response to the timer being running, stopping the timer. Furthermore, radio link failure report (RLF) information is transmitted to
(Continued)

500 a network in response to the failure of Inter-RAT handover from NR to E-UTRAN and UTRAN.

10 Claims, 6 Drawing Sheets

(56) References Cited

U.S. PATENT DOCUMENTS

| | | | | |
|---|---|---|---|---|
| 12,262,266 | B2 * | 3/2025 | Parichehrehteroujeni | .................... |
| | | | | H04W 76/19 |
| 12,294,901 | B2 * | 5/2025 | Hong | ..................... H04W 36/36 |
| 12,328,781 | B2 * | 6/2025 | Yilmaz | ................. H04W 76/19 |
| 2022/0141735 | A1 * | 5/2022 | Liu | ................. H04W 36/00692 |
| | | | | 370/331 |
| 2022/0386204 | A1 * | 12/2022 | Parichehrehteroujeni | ................... |
| | | | | H04W 36/18 |
| 2022/0394584 | A1 * | 12/2022 | Ishii | .................... H04W 36/305 |
| 2024/0172062 | A1 * | 5/2024 | Ramachandra | .............................. |
| | | | | H04W 36/00833 |

FOREIGN PATENT DOCUMENTS

| | | |
|---|---|---|
| WO | 2020113867 A1 | 6/2020 |
| WO | 2020114371 A1 | 6/2020 |

OTHER PUBLICATIONS

Huawei et al. "Discussion on fast handover failure recovery", 3GPP TSG-RAN WG2 Meeting #107b R2-1912744; Oct. 18, 2019; 4 pages.

ZTE Corporation et al. "Support of Inter-RAT handover upon MCG failure recovery", 3GPP TSG-RAN WG2 Meeting#109bis electronic R2-2002700; Apr. 30, 2020; 14 pages.

Nokia et al. "Further thoughts on RLF detection in NR", 3GPP TSG-RAN WG2 Meeting #107bis R2-1913155; Oct. 18, 2019; 4 pages.

European Search Report and Written Opinion dated Mar. 5, 2024 for European patent application No. 20947336.2.

Ericsson. "Inter-RAT MRO—Detection of too early inter-RAT handover wifh no RLF"; 3GPP TSG-RAN WG3 69-BIS, R3-102882, Oct. 11, 2010; pp. 1-8.

International Search Report and Written Opinion dated Apr. 16, 2021 for International Application No. PCT /CN2020/105250.

* cited by examiner

*500* receiving a mobility command message from a source NR cell, the mobility command message includes an ID of a target cell, the target cell is at least one of an E-UTRAN cell and an UTRAN cell 502 determining whether a timer, which is for initiating failure recovery based on triggering a measurement report, is running 504 in response to the timer being running, stopping the timer 506

FIG. 5

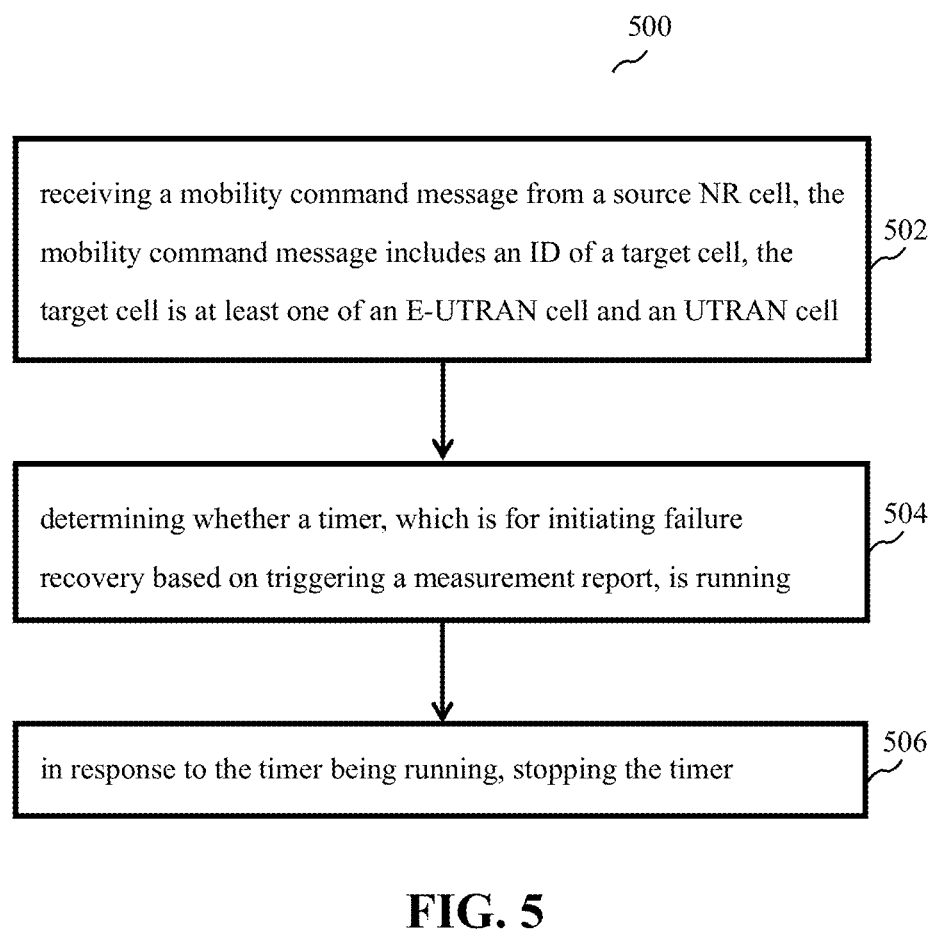

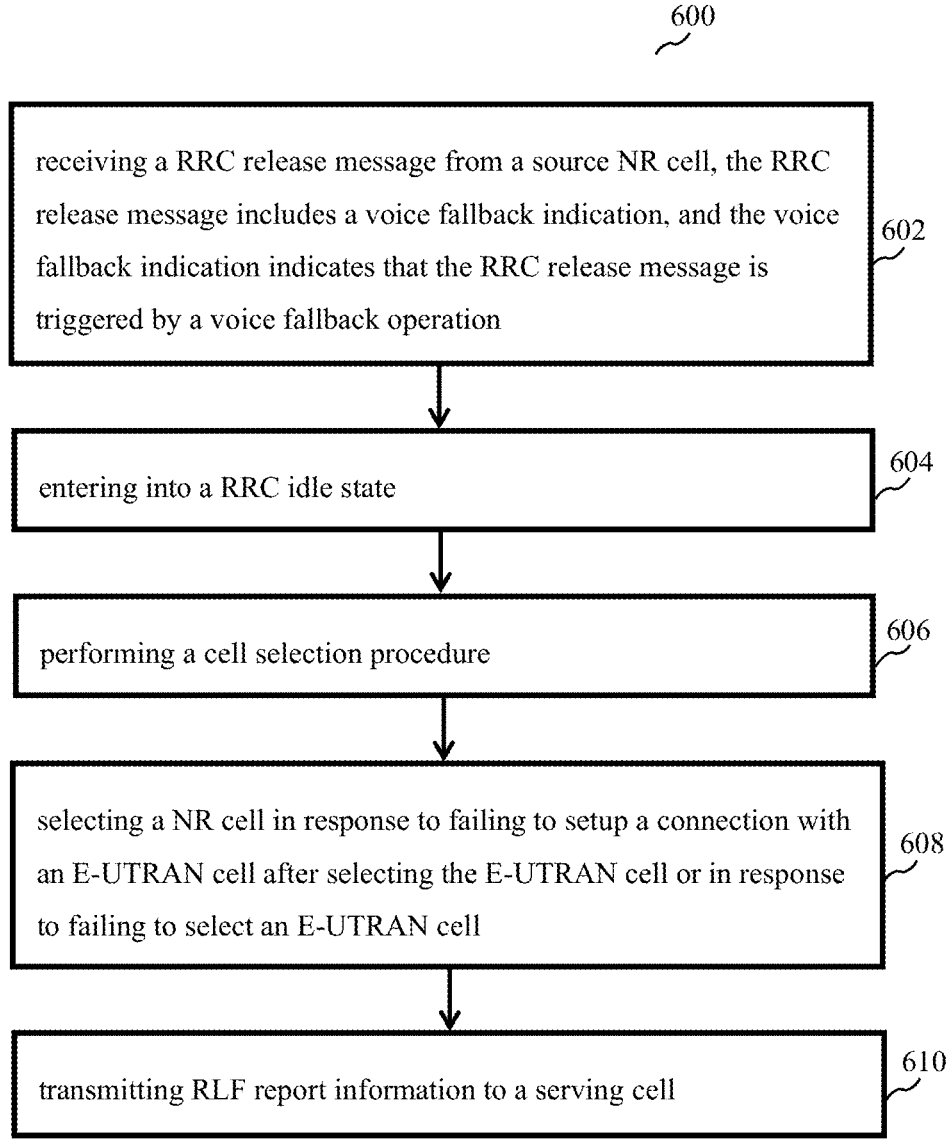

600 receiving a RRC release message from a source NR cell, the RRC release message includes a voice fallback indication, and the voice fallback indication indicates that the RRC release message is triggered by a voice fallback operation          602 entering into a RRC idle state          604 performing a cell selection procedure          606 selecting a NR cell in response to failing to setup a connection with an E-UTRAN cell after selecting the E-UTRAN cell or in response to failing to select an E-UTRAN cell          608 transmitting RLF report information to a serving cell          610

FIG. 6

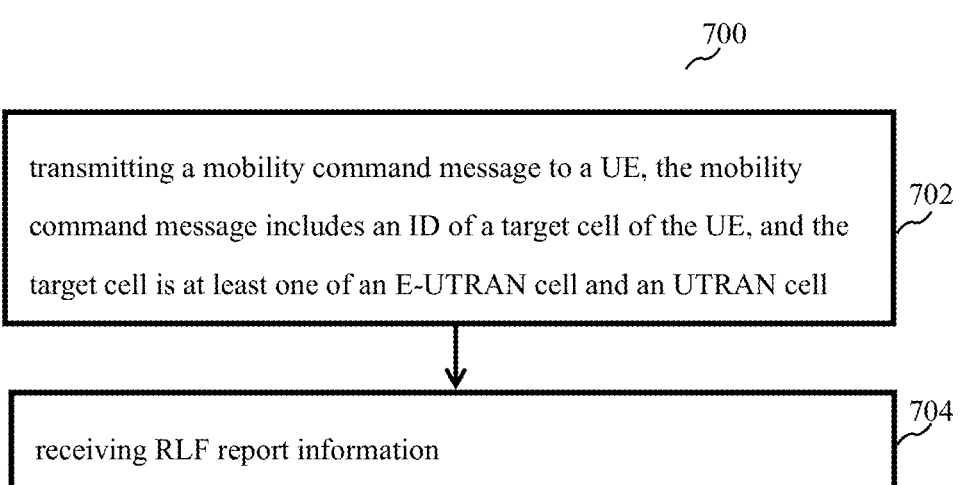

700 transmitting a mobility command message to a UE, the mobility command message includes an ID of a target cell of the UE, and the target cell is at least one of an E-UTRAN cell and an UTRAN cell

702 receiving RLF report information

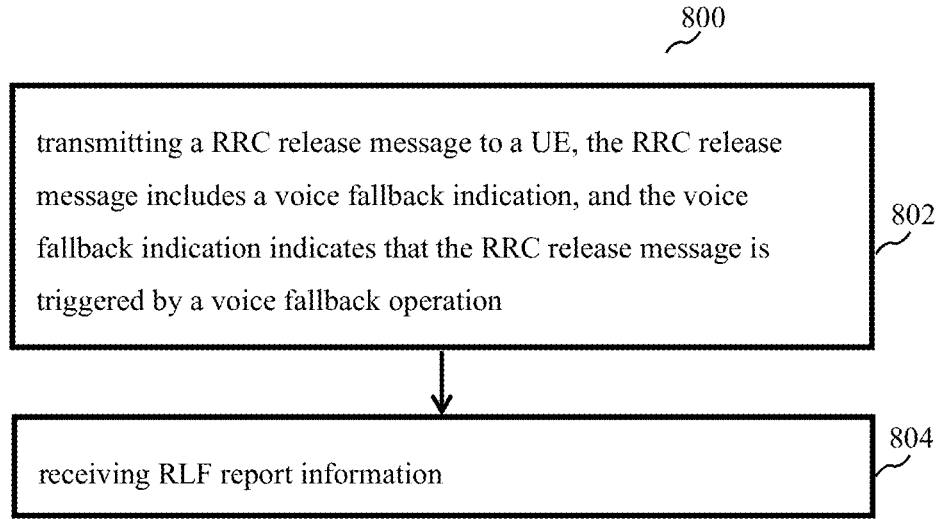

800 transmitting a RRC release message to a UE, the RRC release message includes a voice fallback indication, and the voice fallback indication indicates that the RRC release message is triggered by a voice fallback operation

802 receiving RLF report information

METHODS AND APPARATUSES FOR A MOBILITY ROBUSTNESS OPTIMIZATION (MRO) MECHANISM OF AN INTER-RAT HANDOVER PROCEDURE

CROSS REFERENCE TO RELATED APPLICATIONS

This application is a national phase entry of International Application No. PCT/CN2020/105250, filed on Jul. 28, 2020, which is incorporated by reference in its entirety.

TECHNICAL FIELD

Embodiments of the present application generally relate to wireless communication technology, in particular to methods and apparatuses for a mobility robustness optimization (MRO) mechanism of an inter-radio access technology (RAT) handover procedure.

BACKGROUND

A base station (BS) can have some cells (or areas) to provide communication service. When a user equipment (UE) moves from a serving cell of a source BS to a target cell of a target BS, a handover procedure is performed.

When a radio link failure (RLF) or handover failure (HOF) occurs for a UE, the UE may perform a radio resource control (RRC) re-establishment procedure. The UE may access a cell by a successful RRC re-establishment procedure. The accessed network will request UE information including a RLF report of the UE, such that the network can optimize the mobility problem based on the UE information from the UE. Accordingly, the UE will transmit a failure report to the network.

The 3rd Generation Partnership Project (3GPP) 5G new radio (NR) adopts a MRO mechanism. However, details regarding a MRO mechanism of an inter-RAT handover procedure have not been discussed in 3GPP 5G NR technology yet.

SUMMARY

Some embodiments of the present application provide a method, which may be performed by a UE. The method includes: receiving a mobility command message from a source NR cell, wherein the mobility command message includes an identifier (ID) of a target cell, and the target cell is at least one of an evolved universal terrestrial radio access network (E-UTRAN) cell and an universal terrestrial radio access network (UTRAN) cell; determining whether a timer for initiating failure recovery based on triggering a measurement report (e.g., timer T312) is running; and in response to the timer being running, stopping the timer.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a further method, which may be performed by a UE. The method includes: receiving a RRC release message from a source NR cell, wherein the RRC release message includes a voice fallback indication, and wherein the voice fallback indication indicates that the RRC release message is triggered by a voice fallback operation; entering into an RRC idle state; performing a cell selection procedure; in response to failing to setup a connection with an evolved universal terrestrial radio access network (E-UTRAN) cell after selecting the E-UTRAN cell or in response to failing to select an E-UTRAN cell, selecting a NR cell; and transmitting radio link failure (RLF) report information to a serving cell.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a further method, which may be performed by a BS. The method includes: transmitting a mobility command message to a UE, wherein the mobility command message includes an ID of a target cell of the UE, and the target cell is at least one of an E-UTRAN cell and an UTRAN cell; and receiving RLF report information.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

Some embodiments of the present application provide a further method, which may be performed by a BS. The method includes: transmitting, to a UE, a RRC release message including a voice fallback indication, wherein the voice fallback indication indicates that the RRC release message is triggered by a voice fallback operation; and receiving RLF report information.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a BS.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5 illustrates a flow chart of a method for a handover procedure in accordance with some embodiments of the present application;

FIG. 6 illustrates a further flow chart of a method for a failure information procedure in accordance with some embodiments of the present application;

FIG. 7 illustrates a flow chart of a method for receiving RLF report information in accordance with some embodiments of the present application;

FIG. 8 illustrates a further flow chart of a method for receiving RLF report information in accordance with some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
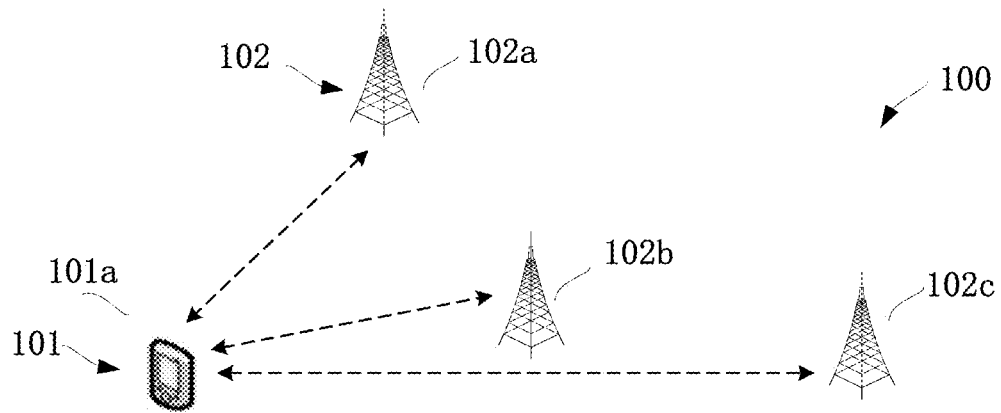
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101a) and three BSs 102 (e.g., BS 102a, BS 102b, and BS 102c) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of transmitting and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of transmitting and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Each BS(s) 102 may include one or more cells. Each UE(s) 101 may perform a cell section procedure between different cell(s) of different BS(s). Each UE(s) 101 may handover from a serving cell of a source BS to a target cell of a target BS. For example, in the wireless communication system 100 as illustrated and shown in FIG. 1, BS 102*a* may function as a source BS, and each of BS 102*b* and BS 102*c* may function as a target BS. If there is a handover need, UE 101*a* as illustrated and shown in FIG. 1 may perform a handover procedure from a serving cell of BS 102*a* to a target cell of BS 102*b* or a target cell of BS 102*c*, which depends a result of a cell selection procedure. The handover procedure performed by UE 101*a* may be a CHO procedure.

According to some agreements of 3GPP standard documents, during a handover procedure from 5G to LTE (i.e., 4G), the inter-RAT handover is characterized by the following:

A source RAT BS configures measurement information and a reporting configuration of a target RAT BS.

The source RAT BS decides a handover procedure and provides necessary information to the target RAT BS.

Radio resources are reserved in the target RAT BS before a UE accesses the target RAT BS.

A RRC reconfiguration message from the target RAT BS is delivered to the source RAT BS as a transparent container, and is transmitted to the UE by the source RAT BS in a handover command. For example, the source BS transmits a MobilityFromNRCommand message to the UE, and the MobilityFromNRCommand message includes the RRC reconfiguration message that is provided by the target RAT BS.

According to some agreements of 3GPP standard documents, during a handover procedure from 5G to 3G, a single radio voice call continuity (SRVCC) operation is performed. A source NR node decides to handover a UE with ongoing an internet protocol multimedia subsystem (IMS) voice from NR to UTRAN according the following principles:

The source NR node configures measurement information and a reporting configuration of a target UTRAN Node.

The source NR node determines that a handover procedure to the target UTRAN node should be initiated.

The source NR node initiates the handover procedure only for the ongoing IMS voice and provides an indication to an access and mobility management function (AMF) to indicate that the handover is towards UTRAN together with an identifier (ID) of the target UTRAN node. The source NR node also indicates to the target UTRAN node that the incoming handover originates from the 5G system.

Radio resources are reserved in the target RAT BS (i.e., the target UTRAN node) before the UE accesses the target RAT BS.

The RRC reconfiguration message from the target RAT BS is delivered to the source NR node via a transparent container and is passed to a UE by the source NR node in the handover command. For example, the source BS transmits, to the UE, a MobilityFromNRCommand message including the RRC reconfiguration message provided by the target RAT BS.

Additionally, 3GPP TS 38.331 defines a mobility procedure from NR to 4G or 3G. The purpose of the mobility procedure is to move a UE in an RRC_CONNECTED state to a cell using another RAT, e.g., an evolved universal terrestrial radio access network (E-UTRAN) cell or an UTRAN-frequency division duplex (FDD) cell. Specific contents are described in FIGS. 2-4.

Figure 2:
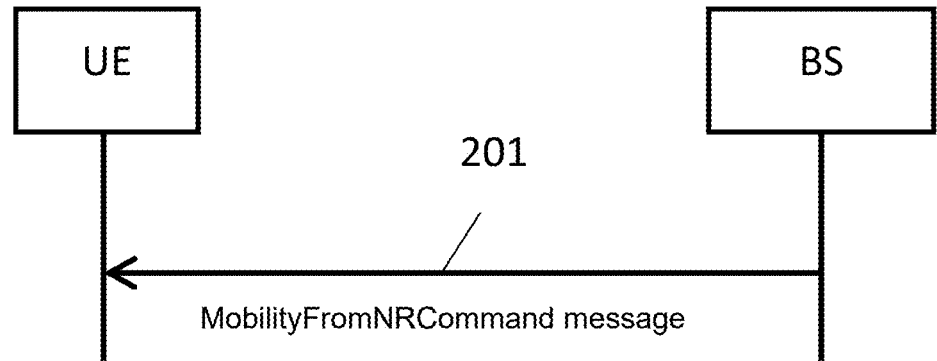
FIG. 2 illustrates an exemplary flowchart of a mobility from NR procedure in accordance with some embodiments of the present application.

FIG. 2 illustrates an exemplary flowchart of a mobility from NR procedure in accordance with some embodiments of the present application. The embodiments of FIG. 2 are performed by a UE which aims to handover from a serving cell of a source BS to a candidate cell of a target BS.

As shown in FIG. 2, in step 201, a BS (e.g., BS 102*a*, BS 102*b*, or BS 102*c* as illustrated and shown in FIG. 1) initiates the mobility from NR procedure to a UE (e.g., UE 101*a* as illustrated and shown in FIG. 1) by transmitting a MobilityFromNRCommand message to the UE. The BS is a source BS which controls a serving cell of the UE. The UE may be in an RRC_CONNECTED state. For example, the MobilityFromNRCommand message includes radio resources that have been allocated for the UE in a candidate cell of a target BS.

Figure 3:
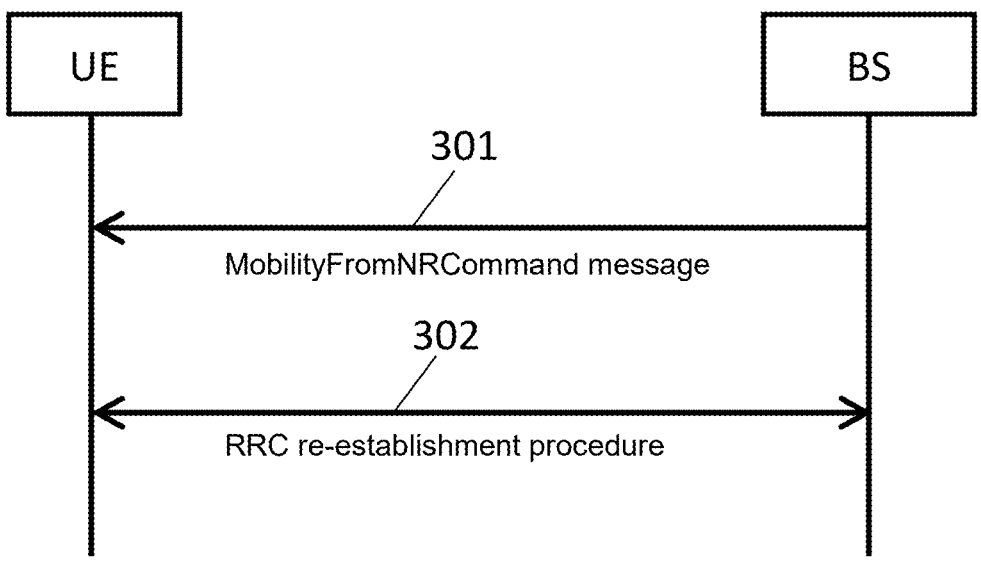
FIG. 3 illustrates a further exemplary flowchart of a mobility from NR procedure in accordance with some embodiments of the present application.

FIG. 3 illustrates a further exemplary flowchart of a mobility from NR procedure in accordance with some embodiments of the present application. Similar to FIG. 2, the embodiments of FIG. 3 are performed by a UE which aims to handover from a serving cell of a source BS to a candidate cell of a target BS.

As shown in FIG. 3, in step 301, a BS which is of a NR RAT type (e.g., BS 102*a*, BS 102*b*, or BS 102*c* as illustrated and shown in FIG. 1) initiates the mobility from NR procedure to a UE (e.g., UE 101*a* as illustrated and shown in FIG. 1) by transmitting a MobilityFromNRCommand message to the UE. The BS is a source BS which controls a serving cell of the UE. The US may be in an RRC_CONNECTED state. For example, the MobilityFromNRCommand message includes radio resources in a candidate cell of a target BS that have been allocated for the UE.

If a failure occurs during an inter-RAT handover procedure of the UE, the UE re-establishes to a cell, which could be a source cell, a target cell, or an additional cell. For instance, as shown in step 302, if a failure occurs during the inter-RAT handover procedure, the UE may perform a RRC re-establishment procedure to the source cell of the BS which sends the MobilityFromNRCommand message. Alternatively, if a failure occurs during the inter-RAT handover procedure, the UE may perform a RRC re-establishment procedure to the candidate cell of the target BS, or the UE may perform a RRC re-establishment procedure to a cell different from the source cell or the candidate target cell.

Figure 4:
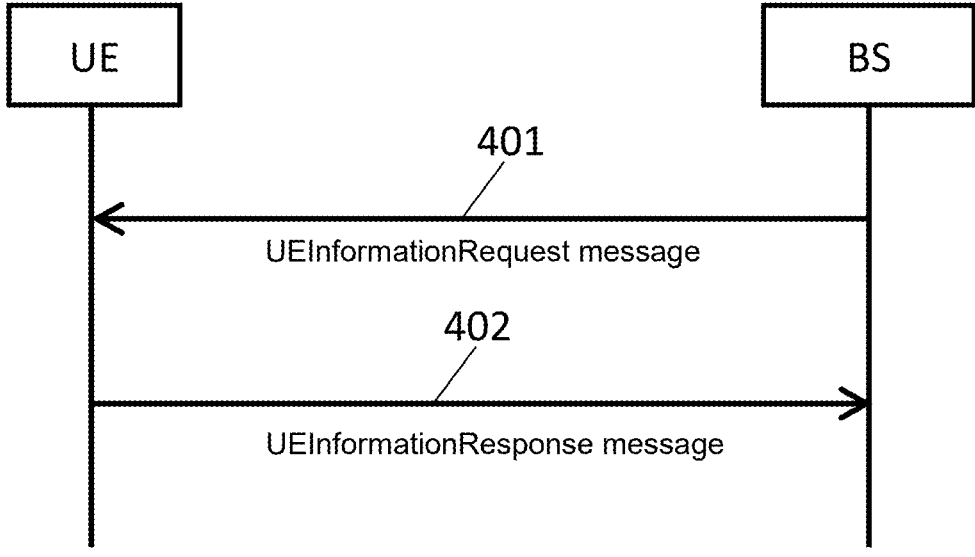
FIG. 4 illustrates an exemplary flowchart of a UE information procedure in accordance with some embodiments of the present application.

FIG. 4 illustrates an exemplary flowchart of a UE information procedure in accordance with some embodiments of the present application.

The UE information procedure in the embodiments of FIG. 4 is used by a BS which aims to request a UE to report information. In particular, a UE may re-establish to a cell after a RLF or a HOF occurs. The UE may access a cell after the UE enters into an RRC idle state because of a RRC re-establishment failure. The UE may transmit an indication, which indicates RLF information available, to the source BS. The source BS transmits a UEinformationrequest message to the UE after the source BS receives the failure information that is available from the UE.

As shown in FIG. 4, in step 401, a source BS (e.g., BS 102*a*, BS 102*b*, or BS 102*c* as illustrated and shown in FIG. 1) initiates the UE information procedure by transmitting a UEInformationRequest message to a UE (e.g., UE 101*a* as illustrated and shown in FIG. 1). The source BS should initiate this UE information procedure only after successful security activation. In step 402, after receiving the UEInformationRequest message, the UE reports a UEInformationResponse message to the source BS. For example, the UE transmits the UEInformationResponse message including a RLF report to the source BS. The UEInformationResponse message may include a RLF report when a RLF occurs.

Generally, a MRO mechanism aims at detecting and enabling a correction of problems for a RLF, a HOF, or a ping-pong issue. In 3GPP Release 16, during an inter-RAT handover procedure, a RLF or a HOF may happen. However, a MRO mechanism for an inter-RAT handover procedure has not been designed. Embodiments of the subject application provide solutions regarding a MRO mechanism for an inter-RAT handover procedure.

The following table shows introductions of some timers as specified in 3GPP standard documents, including a starting condition, a stop condition, an operation at expiry, and a possible general name for each of these timers.

FIG. 5 illustrates a flow chart of a method for a handover procedure in accordance with some embodiments of the present application. The method 500 may be performed by a UE (e.g., UE 101 as shown and illustrated in FIG. 1 or one of UEs as shown and illustrated in FIGS. 2-4). Although described with respect to a UE, it should be understood that other devices may be configured to perform a method similar to that of FIG. 5.

In the exemplary method 500 as shown in FIG. 5, in operation 502, a UE receives a mobility command message from a source NR cell. The mobility command message may include an ID of a target cell. The target cell is at least one of an E-UTRAN cell and an UTRAN cell. In an embodiment, the mobility command message is a MobilityFromNRCommand message as specified in 3GPP standard documents.

In an embodiment, the UE performs a handover procedure to the target cell indicated in the mobility command message. In an embodiment, the UE further receives a RRC reconfiguration message including CHO configuration information associated with one or more candidate cells. The UE may determine whether the selected candidate cell is configured with the CHO configuration information. If the UE determines that the selected candidate cell is configured with

| Timer | Start | Stop | At expiry | Name |
|---|---|---|---|---|
| T304 | Upon reception of a RRCReconfiguration message including reconfigurationWith Sync or upon conditional reconfiguration execution i.e., when applying a stored RRCReconfiguration message including reconfigurationWith Sync. | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in sub-clause 5.7.3 of TS 38.331. | a Handover timer |
| T311 | Upon initiating the RRC connection re-establishment procedure | Upon selection of a suitable NR cell or a cell using another RAT. | Enter into an RRC_IDLE state | a timer for RRC connection re-establishment |
| T312 | If T312 is configured in MCG: Upon triggering a measurement report for a measurement identity for which T312 has been configured, while T310 in PCell is running. If T312 is configured in SCG: Upon triggering a measurement report for a measurement identity for which T312 has been configured, while T310 in PSCell is running. | Upon receiving N311 consecutive in-sync indications from lower layers for the SpCell, receiving a RRCReconfiguration message with reconfigurationWithSync for that cell group, upon initiating the connection re-establishment procedure, and upon the expiry of T310 in corresponding SpCell. Upon SCG release, if the T312 is kept in SCG | If the T312 is kept in MCG: If security is not activated: go to RRC_IDLE else: initiate the connection re-establishment procedure. If the T312 is kept in SCG, Inform E-UTRAN/NR about the SCG radio link failure by initiating the SCG failure information procedure.as specified in sub-clause 5.7.3 of TS 38.331. | a timer for initiating failure recovery based on triggering a measurement report | the CHO configuration information, the UE may perform a CHO procedure to the selected candidate cell.

If a handover failure occurs during the handover procedure (e.g., the CHO procedure), the UE performs a cell selection procedure and selects a suitable candidate cell. Then, the UE may initiate a RRC re-establishment procedure to the selected candidate cell.

For instance, the selected candidate cell may be a NR cell, an E-UTRAN cell, or an UTRAN cell. In an embodiment, if the UE finds one or more candidate cells during the cell selection procedure, and if the found one or more candidate cells include at least one UTRAN cell, the UE selects the UTRAN cell as the selected candidate cell.

If the handover failure occurs during the handover procedure, the UE may transmit RLF report information. In an embodiment, if the mobility command message includes a voice fallback indication, the RLF report information includes an indicator to indicate that the handover procedure is used for a voice fallback operation.

In an embodiment, the RLF report information includes an indicator to indicate: (1) no E-UTRAN cell is found for a voice fallback operation, or (2) no UTRAN cell is found for the voice fallback operation.

In an embodiment, the RLF report information includes an ID of the target cell. In an embodiment, if the handover procedure is performed between different radio access technologies (RATs), the RLF report information includes a RAT type of the target cell. The RAT type may be E-UTRAN or UTRAN-FDD.

In an embodiment, if the selected candidate cell is an UTRAN cell, the RLF report information is transmitted to a BS (e.g., BS 102a, BS 102b, or BS 102c as illustrated and shown in FIG. 1 or one of BSs as shown and illustrated in FIGS. 2-4) which is serving the UE. The BS which is serving the UE may forward a message including the RLF report information to a source BS associated with the source NR cell. For example, the BS which is serving the UE transmits the message including the RLF report information to an AMF, and the AMF is associated with the source NR cell. Then, the AMF transmits the message including the RLF report information to the source BS associated with the source NR cell.

Referring back to FIG. 5, in operation 504, the UE determines whether a timer, which is for initiating failure recovery based on triggering a measurement report, is running. In operation 506, if the UE determines that the timer is running, the UE stops the timer. In an embodiment, the timer is timer T312 as specified in 3GPP standard documents. The UE determines whether timer T312 is running and stops timer T312 when it is running.

The following texts describe four specific embodiments of the method as shown and illustrated in FIG. 5.

Embodiment 1

According to Embodiment 1, a UE (e.g., UE 101 as shown and illustrated in FIG. 1 or one of UEs as shown and illustrated in FIGS. 2-4) and a BS (e.g., BS 102a, BS 102b, or BS 102c as illustrated and shown in FIG. 1 or one of BSs as shown and illustrated in FIGS. 2-4) perform the following operations:

(1) A source BS decides to move a UE to a LTE cell (e.g., an E-UTRAN cell) for a voice traffic.

(2) The UE receives a MobilityFromNRCommand message from the source BS.

After receiving the MobilityFromNRCommand message, the UE stops timer T312 if it is running.

The MobilityFromNRCommand message includes a voice fallback indication.

(3) The UE accesses a target LTE cell (e.g., an E-UTRAN cell) indicated in the MobilityFromNRCommand message.

The UE starts timer T304.

(4) The UE fails to establish a connection to the target LTE cell, e.g., upon an expiry of the timer T304.

(5) The UE performs a cell selection procedure. There may be the following cases of the cell selection procedure.

a) If a suitable LTE cell (e.g., an E-UTRAN cell) is selected during the cell selection procedure, the UE goes to an RRC IDLE state and performs a connection setup procedure to the selected LTE cell.

b) After accessing the selected LTE cell (i.e., the E-UTRAN cell), the UE transmits a RLF report to a BS of the LTE cell which is serving the UE, i.e., the LTE serving cell (i.e., the E-UTRAN cell).

i. The UE reports the RLF report to the LTE serving cell. The RLF report may include additional assistant information, which indicates whether voiceFallbackIndication is included in the MobilityFromNRCommand message. Namely, the RLF report may include an indicator to indicate whether this handover procedure is performed for a voice fallback purpose. For example, a voice fallback indication is included in the RLF report.

c) The BS of the LTE serving cell receives the RLF report from the UE, and then transfers the RLF report to the source BS.

A. If no suitable LTE cell (e.g., an E-UTRAN cell) is selected during the cell selection procedure, the UE may select a NR cell for performing a RRC re-establishment procedure.

B. The UE reports a RLF report to a BS of the selected NR cell. The RLF report may include at least one of the additional assistant information:

ii. assistant information which indicates whether voiceFallbackIndication is included in the MobilityFromNRCommand message. Namely, the RLF report may include an indicator to indicate whether this handover procedure is performed for a voice fallback purpose. For example, a voice fallback indication is included in the RLF report.

iii. assistant information which indicates that no suitable E-UTRAN cell is found for the voice fallback purpose when voiceFallbackIndication is configured.

C. The BS of the selected NR cell receives the RLF report from the UE, and then transfers the RLF report to the target BS associated with the failed handover procedure.

Embodiment 2

According to Embodiment 2, a UE (e.g., UE 101 as shown and illustrated in FIG. 1 or one of UEs as shown and illustrated in FIGS. 2-4) and a BS (e.g., BS 102a, BS 102b, or BS 102c as illustrated and shown in FIG. 1 or one of BSs as shown and illustrated in FIGS. 2-4) perform the following operations:

(1) A source NR BS decides to handover a UE to an UTRAN cell for a voice traffic.

(2) The UE receives a MobilityFromNRCommand message from the source NR BS.

Upon receiving the MobilityFromNRCommand message, the UE stops timer T312 if the timer T312 is running.

The MobilityFromNRCommand message includes voiceFallbackIndication.

(3) The UE accesses a target UTRAN cell indicated in the MobilityFromNRCommand message.

The UE starts timer T304.

(4) The UE fails to establish a connection to the target UTRAN cell, e.g., upon an expiry of the timer T304. Or, a RLF happens in 3G after the UE succeeds in the handover procedure within a period.

(5) The UE performs a cell selection procedure for a RRC re-establishment purpose.

If the UE fails to perform the handover procedure from 5G to 3G or a RLF happens in 3G, the UE will perform a RRC re-establishment procedure. If a suitable UTRAN cell is available during the cell selection procedure, the UE shall select the suitable UTRAN cell for a RRC re-establishment procedure. Otherwise, the UE may select another suitable cell (e.g., a NR cell) for a RRC re-establishment purpose.

(6) After accessing the UTRAN cell or the NR cell, the UE transmits a RLF report to the serving cell. The RLF report may include at least one of the additional assistant information:

assistant information which indicates whether the handover procedure is an inter-RAT handover procedure or not. That is, the assistant information indicates whether the handover procedure is of inter-RAT type or not.

assistant information which indicates that the target cell is E-UTRAN or UTRAN-FDD, if the handover procedure is an inter-RAT handover procedure.

i. For example, the RLF report includes a targetRAT-Type IE, which indicates a RAT type of the target cell. The targetRAT-Type IE may be one of E-UTRAN and UTRAN-FDD. In an embodiment, targetRAT-Type may be enumerated as {eutran, utran-fdd}.

assistant information which indicates an ID of the target cell.

i. For example, a RLF report may include an ID of the target UTRAN Cell of the failed handover procedure. In an embodiment, a field "FailedP-Cellid-UTRAN" or "FailedPCellid-UTRA" is used to indicate an ID of the target UTRAN cell in which a RLF is detected.

(7) The UTRAN cell receives the RLF report from the UE. Then, the UTRAN cell transfers the RLF report as a container to a core network (CN). The node of the UTRAN CN will forward the information including RLF report to an AMF associated with the source NR cell.

(8) The AMF will transfer the received information including the RLF report to the source NR BS.

Embodiment 3

According to Embodiment 3, a UE (e.g., UE 101 as shown and illustrated in FIG. 1 or one of UEs as shown and illustrated in FIGS. 2-4) and a BS (e.g., BS 102a, BS 102b, or BS 102c as illustrated and shown in FIG. 1 or one of BSs as shown and illustrated in FIGS. 2-4) perform the following operations:

(1) A source BS transmits target RAT measurement and reporting configuration information to a UE.

(2) The source BS decides a target cell of a target BS in another RAT and sends a handover request including necessary information (e.g., the context of the UE) to the target BS.

(3) The target BS transmits the RRC reconfiguration message to the source BS.

(4) The source BS transmits the MobilityFromNRCommand message to the UE. The MobilityFromNRCommand message includes the RRC reconfiguration message transmitted from the target BS.

(5) The UE receives the MobilityFromNRCommand message from the network. The MobilityFromNRCommand message indicates information regarding the target cell of the target BS.

After receiving the MobilityFromNRCommand message, the UE stops timer T312 if it is running.

(6) The UE accesses the target cell of the target BS.

Embodiment 4

According to Embodiment 4, a UE (e.g., UE 101 as shown and illustrated in FIG. 1 or one of UEs as shown and illustrated in FIGS. 2-4) and a BS (e.g., BS 102a, BS 102b, or BS 102c as illustrated and shown in FIG. 1 or one of BSs as shown and illustrated in FIGS. 2-4) perform the following operations:

(1) A UE receives CHO configuration information.

(2) The UE receives a MobilityFromNRCommand message from a source NR BS.

Upon receiving the MobilityFromNRCommand message, the UE stops timer T312 if the timer T312 is running.

(3) The UE accesses a target cell indicated in the MobilityFromNRCommand message.

The UE starts timer T304.

(4) The UE does not succeed in establishing a connection to the target cell, e.g., upon an expiry of the timer T304.

(5) The UE initiates a RRC re-establishment procedure and starts timer T311 for a cell selection procedure.

(6) The UE performs a cell selection procedure and selects a suitable NR cell.

The UE Stops timer T311.

(7) The UE applies the stored CHO configuration information associated to the selected suitable NR cell and performs a CHO procedure if the selected cell is configured with the CHO configuration information.

In an example, an attemptCondReconfig IE is used to indicate that CHO configuration information is allowed for the UE. For instance, the UE is allowed to perform a CHO procedure to the selected cell by the following conditions:

"the cell selection is triggered by a failure of an inter-RAT handover procedure from NR", "an attemptCondReconfig 1E is configured", and "the selected cell has been configured with the CHO configuration information".

Details described in all other embodiments of the present application (for example, details of a MRO mechanism of an inter-RAT handover procedure and assistant information in the RLF report information) are applicable for the embodiments of FIG. 5. Moreover, details described in the embodiments of FIG. 5 are applicable for all the embodiments of FIGS. 1-4 and 6-9.

FIG. 6 illustrates a further flow chart of a method for a failure information procedure in accordance with some embodiments of the present application. The method 600 may be performed by a UE (e.g., UE 101 as shown and illustrated in FIG. 1 or one of UEs as shown and illustrated in FIGS. 2-4). Although described with respect to a UE, it should be understood that other devices may be configured to perform a method similar to that of FIG. 6.

In the exemplary method 600 as shown in FIG. 6, in operation 602, a UE receives a RRC release message from a source NR cell. The RRC release message includes a voice fallback indication. The voice fallback indication indicates that the RRC release message is triggered by a voice fallback operation. In operation 604, the UE enters into an RRC idle state.

In operation 606, the UE performs a cell selection procedure. In operation 608, if the UE fails to setup a connection with an E-UTRAN cell after selecting the E-UTRAN cell or if the UE fails to select an E-UTRAN cell, the UE selects a NR cell. In operation 610, the UE transmits RLF report information to a serving cell of the UE.

In an embodiment, the serving cell is the same as the source NR cell. In other words, the UE may reselect back to the source NR cell as its serving cell. In a further embodiment, the serving cell is a cell different from the source NR cell. In other words, the UE may select a different cell as its serving cell.

In an embodiment, the RLF report information includes an indicator to indicate that the RRC release message includes the voice fallback indication. In a further embodiment, the RLF report information includes an indicator to indicate that no E-UTRAN cell is found during the cell selection procedure. In another embodiment, the RLF report information includes an ID of the source NR cell.

The following texts describe a specific Embodiment 5 of the method as shown and illustrated in FIG. 6.

According to Embodiment 5, a UE (e.g., UE 101 as shown and illustrated in FIG. 1 or one of UEs as shown and illustrated in FIGS. 2-4) and a BS (e.g., BS 102*a*, BS 102*b*, or BS 102*c* as illustrated and shown in FIG. 1 or one of BSs as shown and illustrated in FIGS. 2-4) perform the following operations:

(1) A NR BS decides to move a UE to an E-UTRAN cell for a voice traffic.

(2) The UE receives a RRC release message including voiceFallbackIndication from a source cell of the NR BS.

(3) The UE attempts to select an E-UTRAN cell for accessing, but a failure occurs during the handover procedure to the selected E-UTRAN cell.

(4) The UE may reselect back to the source cell. Alternatively, the UE may select a different cell from both the source cell and the selected E-UTRAN cell. When the UE can access the source cell or the different cell, the UE needs to report the RLF report information. More specifically, the RLF report information may include the following potential assistant information:

One indicator indicating that the UE receives a RRC release message including voiceFallbackIndication;

No suitable E-UTRAN cell is found for the voice fallback purpose after the RRC release message including voiceFallbackIndication is received.

An ID of the source cell which transmits the RRC release message including voiceFallbackIndication.

Details described in all other embodiments of the present application (for example, details of a MRO mechanism of an inter-RAT handover procedure and assistant information in the RLF report information) are applicable for the embodiments of FIG. 6. Moreover, details described in the embodiments of FIG. 6 are applicable for all the embodiments of FIGS. 1-5 and 7-9.

FIG. 7 illustrates a flow chart of a method for receiving RLF report information in accordance with some embodiments of the present application. The method 700 may be performed by a BS or a source BS (e.g., BS 102*a*, BS 102*b*, or BS 102*c* as illustrated and shown in FIG. 1 or one of BSs as shown and illustrated in FIGS. 2-4). Although described with respect to a BS, it should be understood that other devices may be configured to perform a method similar to that of FIG. 7.

In the exemplary method 700 as shown in FIG. 7, in operation 702, a source BS transmits a mobility command message to a UE (e.g., UE 101 as shown and illustrated in FIG. 1 or one of UEs as shown and illustrated in FIGS. 2-4). The mobility command message includes an ID of a target cell of the UE. The target cell is at least one of an E-UTRAN cell and an UTRAN cell.

In an embodiment, the mobility command message is a MobilityFromNRCommand message as specified in 3GPP standard documents. The mobility command message may include a voice fallback indication (e.g., voiceFallbackIndication as specified in 3GPP standard documents).

In operation 704, the source BS receives RLF report information, e.g., from the UE.

In an embodiment, if the mobility command message includes a voice fallback indication (e.g., voiceFallbackIndication as specified in 3GPP standard documents), the RLF report information includes an indicator to indicate that a handover procedure is used for a voice fallback operation.

In a further embodiment, the RLF report information includes an indicator to indicate that no E-UTRAN cell is found for a voice fallback operation. In an additional embodiment, the RLF report information includes an indicator to indicate that no UTRAN cell is found for the voice fallback operation.

In another embodiment, a BS which is serving the UE forwards a message to the source BS, and the message contains the RLF report information. In an example, the serving BS transmits the message including the RLF report information to an AMF, and the AMF forwards the message to the source BS.

In an embodiment, the RLF report information includes an ID of the target cell of the UE.

Details described in all other embodiments of the present application (for example, details of a MRO mechanism of an inter-RAT handover procedure and assistant information in the RLF report information) are applicable for the embodiments of FIG. 7. Moreover, details described in the embodiments of FIG. 7 are applicable for all the embodiments of FIGS. 1-6, 8, and 9.

FIG. 8 illustrates a further flow chart of a method for receiving RLF report information in accordance with some embodiments of the present application. The method 800 may be performed by a BS or a source BS (e.g., BS 102*a*, BS 102*b*, or BS 102*c* as illustrated and shown in FIG. 1 or one of BSs as shown and illustrated in FIGS. 2-4). Although described with respect to a BS, it should be understood that other devices may be configured to perform a method similar to that of FIG. 8.

In the exemplary method 800 as shown in FIG. 8, in operation 802, a BS may transmits a RRC release message to a UE (e.g., UE 101 as shown and illustrated in FIG. 1 or one of UEs as shown and illustrated in FIGS. 2-4). The RRC release message includes a voice fallback indication (e.g., voiceFallbackIndication as specified in 3GPP standard documents). The voice fallback indication indicates that the RRC release message is triggered by a voice fallback operation. In some cases, the UE fails to select a suitable E-UTRA cell, or the UE fails to setup a connection with an E-UTRA cell after selecting the E-UTRA cell. Then, under these cases, the UE selects a NR cell. The UE may transmit RLF report information to a serving cell after the UE accesses the selected NR cell.

In operation 804, the source BS receives the RLF report. In an example, if the selected NR cell is the source cell of the UE, the UE will transmit the RLF report information to the source BS. In a further example, if the selected NR cell is not the source cell, the UE transmits the RLF report information to the serving BS. Then, the serving BS will transfer the received RLF report information to the source BS.

In an embodiment, the RLF report information includes an indicator to indicate that the RRC release message includes the voice fallback indication.

In a further embodiment, the RLF report information includes an indicator to indicate that no E-UTRAN cell is found during a cell selection procedure of the UE.

In another embodiment, the RLF report information includes an ID of a source NR cell of the UE.

Details described in all other embodiments of the present application (for example, details of a MRO mechanism of an inter-RAT handover procedure and assistant information in the RLF report information) are applicable for the embodiments of FIG. 8. Moreover, details described in the embodiments of FIG. 8 are applicable for all the embodiments of FIGS. 1-7 and 9.

Figure 9:
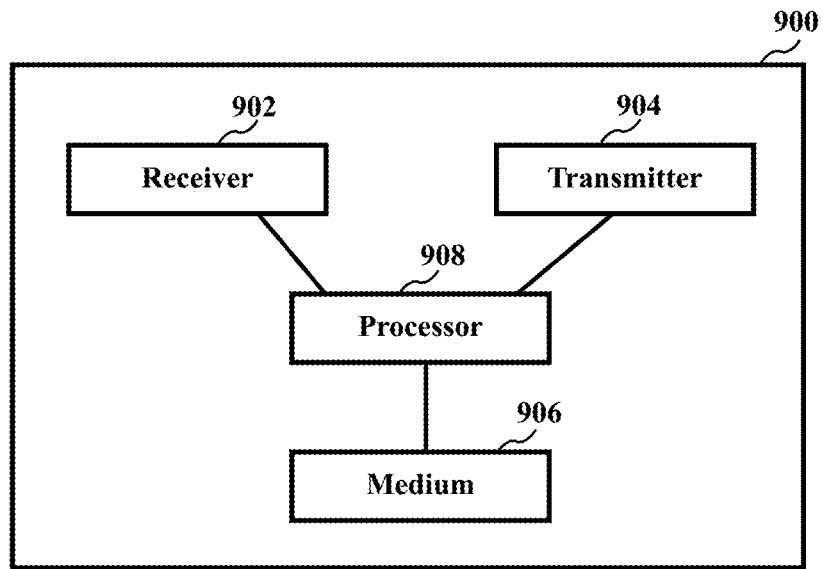
FIG. 9 illustrates an exemplary block diagram of an apparatus according to some embodiments of the present application.

FIG. 9 illustrates an exemplary block diagram of an apparatus according to some embodiments of the present application. In some embodiments of the present application, the apparatus 900 may be a UE, which can at least perform the method illustrated in FIG. 5 or FIG. 6. In some embodiments of the present application, the apparatus 900 may be a BS (e.g., a source BS), which can at least perform the method illustrated in FIG. 7 or FIG. 8.

As shown in FIG. 9, the apparatus 900 may include at least one receiver 902, at least one transmitter 904, at least one non-transitory computer-readable medium 906, and at least one processor 908 coupled to the at least one receiver 902, the at least one transmitter 904, and the at least one non-transitory computer-readable medium 906.

Although in FIG. 9, elements such as the at least one receiver 902, the at least one transmitter 904, the at least one non-transitory computer-readable medium 906, and the at least one processor 908 are described in the singular, the plural is contemplated unless limitation to the singular is explicitly stated. In some embodiments of the present application, the at least one receiver 902 and the at least one transmitter 904 are combined into a single device, such as a transceiver. In certain embodiments of the present application, the apparatus 900 may further include an input device, a memory, and/or other components.

In some embodiments of the present application, the at least one non-transitory computer-readable medium 906 may have stored thereon computer-executable instructions which are programmed to implement the operations of the methods, for example as described in view of any of FIGS. 5-8, with the at least one receiver 902, the at least one transmitter 904, and the at least one processor 908.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. An apparatus for wireless communication, comprising:
at least one memory; and
at least one processor coupled with the at least one memory and configured to cause the apparatus to:
receive a mobility command message from a source new radio (NR) cell, wherein the mobility command message includes an identifier (ID) of a target cell, and the target cell is at least one of an evolved universal terrestrial radio access network (E-UTRAN) cell and a universal terrestrial radio access network (UTRAN) cell;
determine whether a timer for initiating failure recovery based on triggering a measurement report is running;
when the timer is running, stop the timer;
perform a handover procedure to the target cell;
in response to an occurrence of a handover failure during the handover procedure, perform a cell selection procedure and select a UTRAN cell as a candidate cell; and
initiate a radio resource control (RRC) re-establishment procedure to the selected candidate cell.

2. The apparatus of claim 1, wherein the at least one processor is further configured to cause the apparatus to:
receive an RRC reconfiguration message including conditional handover (CHO) configuration information associated with the one or more candidate cells;
determine whether the selected candidate cell is configured with the CHO configuration information; and
in response to the selected candidate cell being configured with the CHO configuration information, perform CHO procedure to the selected candidate cell.

3. The apparatus of claim 1, wherein the at least one processor is further configured to cause the apparatus to:

in response to the occurrence of the handover failure, transmit radio link failure (RLF) report information.

4. The apparatus of claim 3, wherein, in response to the mobility command message including a voice fallback indication, the RLF report information includes an indicator to indicate that the handover procedure is used for a voice fallback operation.

5. The apparatus of claim 3, wherein the apparatus is a user equipment (UE), wherein the RLF report information is transmitted to a base station (BS) serving the UE, and wherein the BS forwards a message including the RLF report information to a source BS associated with the source NR cell.

6. An apparatus for wireless communication, comprising:

at least one memory; and at least one processor coupled with the at least one memory and configured to cause the apparatus to:

receive a mobility command message from a source new radio (NR) cell, wherein the mobility command message includes an identifier (ID) of a target cell, and the target cell is at least one of an evolved universal terrestrial radio access network (E-UTRAN) cell and a universal terrestrial radio access network (UTRAN) cell;

determine whether a timer for initiating failure recovery based on triggering a measurement report is running;

when the timer is running, stop the timer;

perform a handover procedure to the target cell; and in response to an occurrence of a handover failure during the handover procedure, transmit radio link failure (RLF) report information, wherein the RLF report information includes an indicator to indicate that the handover procedure is used for a voice fallback operation when the mobility command message including a voice fallback indication.

7. The apparatus of claim 6, wherein, in response to the occurrence of the handover failure during the handover procedure, the at least one processor is configured to cause the apparatus to:

perform a cell selection procedure and select a candidate cell; and initiate a radio resource control (RRC) re-establishment procedure to the selected candidate cell.

8. The apparatus of claim 7, wherein the selected candidate cell is at least one of an NR cell, a E-UTRAN cell, and a UTRAN cell.

9. The apparatus of claim 7, wherein the at least one processor is further configured to cause the apparatus to:

receive an RRC reconfiguration message including conditional handover (CHO) configuration information associated with one or more candidate cells;

determine whether the selected candidate cell is configured with the CHO configuration information; and in response to the selected candidate cell being configured with the CHO configuration information, perform a CHO procedure to the selected candidate cell.

10. A user equipment (UE) for wireless communication, comprising:

at least one memory; and at least one processor coupled with the at least one memory and configured to cause the UE to:

receive a mobility command message from a source new radio (NR) cell, wherein the mobility command message includes an identifier (ID) of a target cell, and the target cell is at least one of an evolved universal terrestrial radio access network (E-UTRAN) cell and a universal terrestrial radio access network (UTRAN) cell;

determine whether a timer for initiating failure recovery based on triggering a measurement report is running;

when the timer is running, stop the timer;

perform a handover procedure to the target cell;

in response to an occurrence of a handover failure during the handover procedure:

perform a cell selection procedure and select a UTRAN cell as a candidate cell;

initiate a radio resource control (RRC) re-establishment procedure to the selected candidate cell; and transmit radio link failure (RLF) report information to a base station (BS) serving the UE.

* * * * *